United States Patent [19]
Nitta et al.

[11] 3,789,294
[45] Jan. 29, 1974

[54] APPARATUS FOR MEASURING INSULATING AND VOLTAGE RESISTANT CHARACTERISTICS OF ARTICLES

[75] Inventors: Hifumi Nitta, Minokamo; Mitsutaka Kaneko, Aichi-ken, both of Japan

[73] Assignee: Chubu Seiki Kabushiki Kaisha, Aichi-ken, Japan

[22] Filed: July 19, 1972

[21] Appl. No.: 273,265

[52] U.S. Cl. ............................................. 324/54
[51] Int. Cl. ........................................... G01r 31/12
[58] Field of Search .................... 324/54, 55, 72

[56] References Cited
UNITED STATES PATENTS

| | | | |
|---|---|---|---|
| 2,920,270 | 1/1960 | Saw | 324/54 |
| 3,071,724 | 1/1963 | Rohats et al. | 324/54 |
| 3,339,136 | 8/1967 | Rasor et al. | 324/54 |
| 3,259,893 | 7/1966 | Parker | 324/54 X |
| 3,354,387 | 11/1967 | Whaley et al. | 324/55 |
| 3,042,861 | 7/1962 | Brys | 324/54 X |
| 3,321,703 | 5/1967 | Tyszewicz | 324/54 |
| 3,652,932 | 3/1972 | Sessler et al. | 324/72 |

*Primary Examiner*—Gerard R. Strecker
*Attorney, Agent, or Firm*—Ernest G. Montague

[57] ABSTRACT

Device for measuring insulating and voltage resistant characteristics of articles such as a high voltage cable wherein a low battery voltage in converted into a high direct current voltage with the aid of successive stages of oscillator, transformer and rectifier circuits whose output is applied across an article to be measured. The input bias of a transistor is changed in a manner such that the output of the circuits is made a given value whereby the insulating and voltage resistant characteristics of the article are measured by observing the indication of a voltmeter and ammeter.

3 Claims, 2 Drawing Figures

APPARATUS FOR MEASURING INSULATING AND VOLTAGE RESISTANT CHARACTERISTICS OF ARTICLES

This invention relates to a device for measuring insulating and voltage resistant characteristics of articles to be measured which is capable of transforming a direct curent into an alternating current and of effecting voltage rise whereby the insulating and voltage resistant tests of the article to be measured can be performed in a simple and reliable manner.

Heretofore, it has been the common practice to measure the insulation deterioration of a high voltage cable etc. with the aid of measurement of insulating resistance by means of a megger, measurement of tan δ or measurement of corona etc. Such conventional measuring methods, however, make use of a measuring apparatus which is troublesome and difficult in operation, and as a result, the apparatus could not generally be utilized.

A method of measuring leakage current by means of a high direct current voltage has also been proposed. This method, however, is required to use an extremely stable high direct current voltage, with the result that the measuring apparatus becomes large in size and troublesome in operation. Thus, such conventional method has not generally been used.

Figure 1:
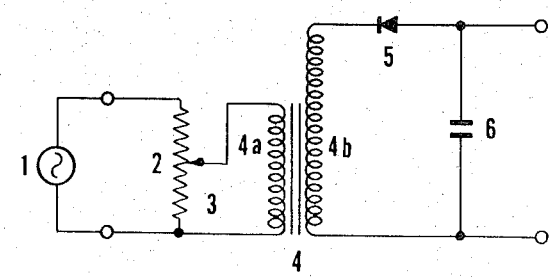

The method of measuring leakage current by means of the high direct current voltage has been considered to be most effective as the method of measuring the insulation deterioration of the high voltage cable. Such conventional method makes use of an apparatus, as shown in FIG. 1, which comprises a commercial frequency electric supply source 1 and a variable resistor 2 connected across the source 1. Between one end of the resistor 2 and the secondary terminal 3 is connected the primary winding 4a of a transformer 4. Across the terminals of the secondary winding 4b of the transformer is connected a rectifier circuit comprising a diode 5 and a condenser 6. A high direct current voltage on the order of 10KV to 15KV is obtained across the condenser 6. This high direct current voltage is applied to articles to be measured and the leakage current is measured.

As seen from FIG. 1, such conventional apparatus is required to use the commercial frequency electric supply source, and hence has the disadvantages that the apparatus is not suitable as of a portable type, that the place to be installed is limited, and that the change of the supply source voltage is directly influenced upon the direct current voltage applied to the article to be measured, thereby producing errors in measurement results.

Moreover, the circuit arrangement shown in FIG. 1 is required to use the transformer 4 and voltage resistant condenser 6 which are large in volume and heavy in weight.

An object of this invention is to provide a device of the above-described type which can obviate the disadvantages of the conventional apparatus.

A feature of the invention is the provision of an improved device for measuring insulating and voltage resistant characteristics of articles to be measured whereby a battery voltage is transformed into an alternating current voltage by means of an oscillator whose output is raised and transformed into a high direct current voltage, which is suitable for use in measurements of insulation deterioration for cables, generators, transformers etc. and for use in voltage resistant tests by means of a high direct current voltage, and which is small in size, light in weight, suitable as a portable type, simple and easy in operation and can prevent the measurement from becoming errorneous due to the charge of the electric supply source voltage.

Figure 2:
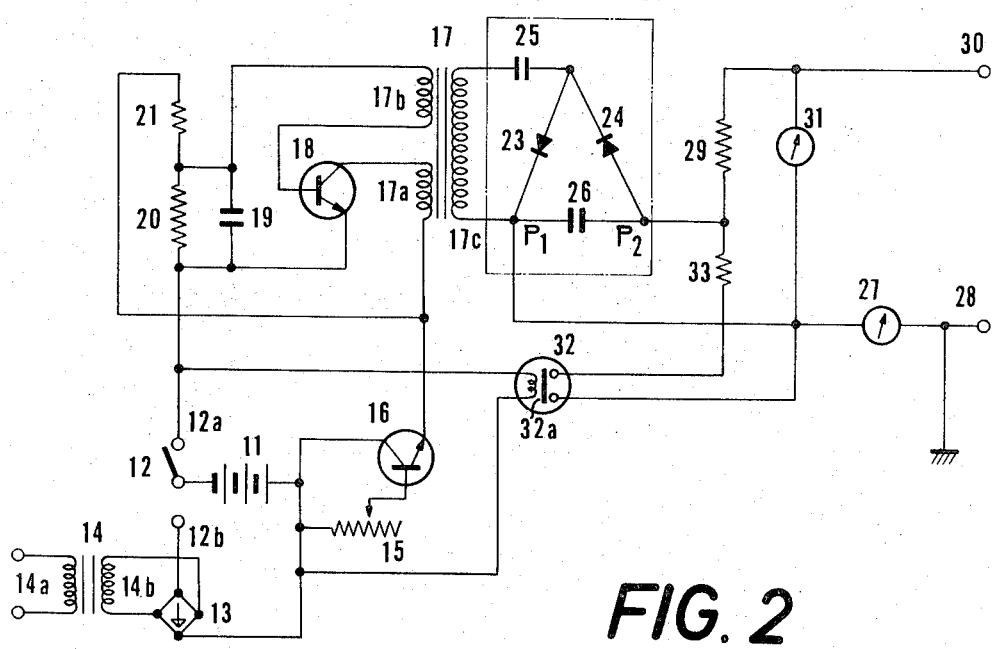

Another objects and advantages of this invention is more clearly understood from the following description taken in connection with the attached drawing, in which:

FIG. 1 is a circuit diagram of a conventional device for measuring leakage current by means of high direct current voltage, and FIG. 2 is a circuit diagram of one embodiment of the device for measuring insulating and voltage resistant characteristics according to the invention.

Referring to the drawings, especially to FIG. 2, reference numeral 11 denotes a storage battery. The negative terminal of the battery 11 is directly connected to the movable terminal of a change-over switch 12. This movable terminal is adapted to be connected to a fixed terminal 12a or 12b. The fixed terminal 12b is directly connected to the negative ourput terminal of a rectifier circuit 13 whose positive output terminal is connected to the positive terminal of the battery 11.

The input terminals of the rectifier circuit 13 are connected across the secondary winding 14b of a transformer 14 whose primary winding 14a is connected across an alternating current source of supply.

If the movable terminal of the change-over switch 12 is closed to the fixed terminal 12b, the alternating current supply voltage is applied through the transformer 14 across the rectifier circuit 13. The rectified voltage is supplied to the battery 11 to charge it.

The positive electrode of the battery 11 is connected through a variable resistor 15 to the base of a transistor 16 adapted to adjust the voltage. The collector of the transistor 16 is directly connected to the positive electrode of the battery 11, while the emitter is connected through the primary winding 17a of an oscillator transformer 17 to the collector of an oscillator transistor 18.

The emitter of the oscillator transistor 18 is directly connected to the fixed termianl 12a of the turn-over switch 12, while the base is connected through the secondary winding 17b of the oscillator transformer 17 and a condenser 19 adapted to protect the oscillator transistor 18 to the fixed terminal 12a of the turn-over switch 12. The base of the oscillator 18 is further connected from the fixed terminal 12a through series connected resistors 20, 21 to a connection point between the above mentioned primary winding 17a and the emitter of the transistor 16. The connection point between the resistors 20 and 21 is connected to a connection point between the secondary winding 17b and the condenser 19, thereby forming a blocking oscillator circuit mainly consisting of the oscillator transistor 18 and oscillator transformer 17. The blocking oscillator circuit is described as an oscillator circuit for ease of illustration, but the oscillator circuit is not limited to the blocking oscillator circuit and a multivibrator or any other oscillator circuits may be used as the oscillator circuit.

The number of turns of the tertiary winding 17c of the oscillatro transformer 17 is made more than that of the primary winding 17a and across the tertiary winding 17c are connected the input terminals of a high direct current voltage generating circuit 22. The high direct current voltage generating circuit 22 comprises diodes 23, 24 and condensers 25, 26 and forms a double voltage rectifier circuit adapted to obtain a direct current output voltage of the order , for examples, of 20KV. As the high direct current voltage generating circuit 22, use may also be made of a cockcraft circuit etc. The positive output terminal P1 of the high direct current voltage generating circuit 22 is connected through an ammeter 27 to a measuring terminal 28 which is grounded.

The negative output terminal P2 of the high direct current voltage generating circuit 22 is connected through a resistor 29 to another measuring emitter 30. Between the measuring terminal 30 and the positive output terminal P1 is connected a voltmeter 31. The positive output terminal P1 is also connected through the contact 32a of a relay 32 and a resistor 33 to the alternating output terminal P2.

The terminals of the exciting coil of the relay 32 are directly connected to the fixed terminal 12a of the turn-over switch 12 and to the positive electrode of the battery 11, respectively. The contact 32a of the relay 32 is adapted to be closed when the exciting coil is de-energized. In order to prevent the contact 32a being deteriorated owing to the spark produced when the contact 32a is opened or closed and also to protect the contact 32a against the voltage, in the embodiment shown in the drawing the contact 32a is immersed into insulating oil.

The operation of the apparatus according to the invention will now be described. In the first place between the measuring terminals 28 and 30 there is connected an article to be measured such as, for example, a high voltage cable. Then, the movable terminal of the turn-over switch 12 is turned to the fixed terminal 12a. Thus, the exciting coil of the relay 32 is energized from the battery 11 to open the normally closed contact 32a and the positive electrode voltage of the battery 11 is applied through the variable resistor 15 to the base of the transistor 16. As a result, the passage from the collector to the emitter of the transistor 16 becomes conductive, whereby the positive electrode voltage of the battery 11 is applied to the primary winding 17a of the oscillator transformer 17.

At the same time, the voltage dependent on the ratio of the resistance values of the resistors 20, 21 is applied through the secondary windings 17b of the oscillator transformer 17 to the passage from the base to the emitter of the transistor 18. In this condition, the voltage applied to the primary winding 17a of the oscillator transformer 17 causes a very small current to flow from the positive electrode of the battery 11 through the passage from collector to emitter of the transistor 16, primary winding 17a and the passage from collector to emitter of the transistor 18 to the negative electrode of the battery 11. The change of this very small current causes a voltage to be induced in the secondary winding 17b of the oscillator transformer 17 in a direction towards the base of the transistor 18, thereby applying the voltage thereto. At the same, the passage from the collector to the emitter of the transistor 18 becomes conductive, and as a result, the voltage is induced in the tertiary winding 17c of the oscillator transformer 17. At the next moment when the change of the current flowing through the primary winding 17a becomes disappeared, the voltage to be induced in the secondary winding 17b becomes zero. Thus the voltage applied to the base of the transistor 18 returns to the condition at which the fixed contact 12a of the turn-over switch 12 is open, thereby rapidly decreasing the current flowing through the primary winding 17a. Thus, the voltage to be induced in the tertiary winding 17c becomes also zero, and as a result, oscillating condition is maintained to generate a high voltage across the tertiary winding 17c.

The high voltage generated in the tertiary winding 17c is rectified by means of the high direct current voltage generating circuit 22 into a high direct current voltage which is then applied to the article to be measured connected between the measuring terminals 28 and 30. In this case, the voltage applied between the measuring terminals 28 and 30 is read by the indication of the voltmeter 31. When the voltage is lower or higher than a given valve the variable resistor 15 is adjusted while reading the indication of the voltmeter 31 to vary the voltage applied to the base of the transistor 16. As a result, the conductive condition in the passage from the collector to the emitter of the transistor 16 is changed to vary the current flowing through the primary winding 17a of the oscillator transformer 17. Thus, the voltage to be induced in the tertiary winding 17c is also changed to make the voltage applied between the measuring terminals 28 and 30 a given value. When the given voltage is applied to the article to be measured, the current flowing through the ammeter 27 shows whether or not the insulating characteristic of the article is deteriorated. That is, if the current flowing through the ammeter 27 is of a value larger than a given valve, it shows that the insulating characteristic of the article is deteriorated. Thus, the apparatus according to the invention makes it possible to measure the insulating characteristic or the voltage resistant characteristic of the article.

If the insulating condition of the article to be measured is good after the above described measurement has been completed, a high voltage charge is accumulated in the article so that it is dangerous to touch with the article. In order to avoid such danger, the movable terminal of the turn-over switch 12 is made open from the fixed terminal 12a as soon as the above described measurement has been completed. Thus, the exciting coil of the relay 32 is denergized, and as a result, the contact 32a is closed to discharge the charge of the article to the ground, thereby avoiding the above described danger.

In order to increase the utility of the apparatus according to the invention as a portable type, the battery 11 may be charged, if necessary, In such a case, the primary winding 14a of the transformer 14 is connected to an alternating current supply source and the movable terminal of the turnover switch 12 is closed to the fixed terminal 12b. Then, the output voltage of the rectifier circuit 13 is applied between the electrodes of the battery 11, and as a result, the life time of the battery 11 becomes increased.

As stated hereinbefore, the invention is capable of transforming the battery voltage into a high alternating current voltage and then converting, this alternating voltage into a direct current voltage to be applied to the article to be measured. Thus, the invention has the advantages that the measuring error due to the change of the supply voltage can reliably be prevented, that the apparatus can be made small in size and light in weight, and hence is suitable to construct as a portable type, and that the apparatus is simple and reliable in operation and can easily be mounted in a cubicle or on a pole.

Moreover, the apparatus according to the invention conprises a circuit for discharging a high voltage electric charge accumulated on articles to be measured after the measurement has been completed. Thus it is possible to automatically discharge such electric charge as soon as the measurement has been completed so that the measurement can be effected in safety.

In addition, the apparatus according to the invention permits the measuring voltage to be adjusted in accordance with the kinds of articles to be measured, and as a result, the insulating characteristic or voltage resistant characristic can accurately be measured irrespective of the kinds of articles to be measured.

We claim:

1. A portable device for measuring insulating and voltage resistant characteristics of an article to be measured by a high direct current voltage comprising, an oscillator circuit operated by an electric source and including an oscillator transformer which has a primary winding connected between collector and emitting electrodes of a transistor, a secondary winding having one end connected to a base electrode of said transistor and the other end connected to the emitter electrode of said transistor through a condenser and a tertiary winding for generating a high alterminating current voltage, a high voltage direct current generating circuit means connected to said tertiary winding to convert the high voltage alternating current output into a high voltage direct current which is applied to said article to be measured, and a discharging circuit means including a relay energized by said electric source when operating said oscillator circuit and having a contact for connecting the output of said direct current operating circuit means to ground to discharge an electric charge accumulated on said article when the electric source to said oscillator circuit is disconnected.

2. A portable device according to claim 1 wherein said electric source is a storage battery which is connected to the base electrode of transistor through a variable resistor for controlling the output of said oscillator circuit by varying the voltage impressed to the base electrode of said transistor.

3. A portable device according to claim 1 wherein a voltmeter is connected in parallel to the output of said high voltage direct current generating circuit means and an ammeter is connected in series to the output of said high voltage direct current generating circuit means for detecting leakage current.

* * * * *